(12) United States Patent
Xia et al.

(10) Patent No.: US 6,517,712 B2
(45) Date of Patent: Feb. 11, 2003

(54) DESCENDING BED FILTER

(75) Inventors: Yongming Xia, Kingwood, TX (US); James E. Thompson, The Woodlands, TX (US); Jeffrey S. Devine, The Woodlands, TX (US)

(73) Assignee: Ashbrook Corporation, Houston, TX (US)

( * ) Notice: Subject to any disclaimer, the term of this patent is extended or adjusted under 35 U.S.C. 154(b) by 0 days.

(21) Appl. No.: 09/966,317

(22) Filed: Sep. 27, 2001

(65) Prior Publication Data

US 2002/0036164 A1 Mar. 28, 2002

Related U.S. Application Data

(62) Division of application No. 09/553,511, filed on Apr. 20, 2000, now Pat. No. 6,319,413.

(51) Int. Cl.[7] .............................................. B01D 24/46
(52) U.S. Cl. ...................... 210/189; 210/268; 210/274; 210/786; 210/794
(58) Field of Search .................................. 210/189, 268, 210/274, 676, 678, 786, 794

(56) References Cited

U.S. PATENT DOCUMENTS

| | | | |
|---|---|---|---|
| 650,611 A | 5/1900 | Reeves | |
| 800,113 A | 9/1905 | Kassian | |
| 1,565,233 A | 12/1925 | Berntsen | |
| 2,057,887 A | 10/1936 | Elliott et al. | 210/141 |
| 2,073,388 A | 3/1937 | Elliott et al. | 127/9 |
| 2,468,838 A | 5/1949 | Rey | 210/141 |
| 3,537,582 A | 11/1970 | Demeter | 210/268 |
| 3,563,385 A | 2/1971 | Bykov | 210/268 |
| 3,598,235 A | 8/1971 | Demeter | 210/189 |
| 3,667,604 A | 6/1972 | Lagoutte | 210/136 |
| 3,767,048 A | 10/1973 | Prengemann | 210/77 |
| 4,052,300 A | 10/1977 | Mosso | 210/20 |
| 4,060,484 A | 11/1977 | Austin et al. | 210/80 |
| 4,126,546 A | 11/1978 | Hjelmnér et al. | 210/19 |
| 4,246,102 A | 1/1981 | Hjelmnér et al. | 210/704 |
| 4,340,485 A | 7/1982 | Ikeda et al. | 210/675 |
| 4,399,034 A | 8/1983 | Möller | 210/268 |
| 4,707,252 A | 11/1987 | Durot et al. | 210/151 |
| 4,720,347 A | 1/1988 | Berne | 210/792 |
| 4,861,472 A | 8/1989 | Weis | 210/189 |
| 4,891,142 A | 1/1990 | Hering, Jr. | 210/792 |
| 4,900,434 A | 2/1990 | Schade | 210/189 |
| 5,154,824 A | 10/1992 | Anderson | 210/274 |
| 5,173,194 A | 12/1992 | Hering, Jr. | 210/792 |
| 5,277,829 A | 1/1994 | Ward | 210/792 |
| 5,454,959 A | 10/1995 | Stevens | 210/792 |
| 5,462,654 A | 10/1995 | Hering, Jr. | 210/97 |
| 5,520,804 A | 5/1996 | Ward | 210/189 |
| 5,543,037 A | 8/1996 | Hering, Jr. | 210/104 |
| 5,582,722 A | 12/1996 | Wachinski et al. | 210/189 |
| 5,681,472 A | 10/1997 | Jönsson et al. | 210/618 |
| 5,698,106 A | 12/1997 | Larsson et al. | 210/675 |
| 5,746,913 A | 5/1998 | Chang et al. | 210/189 |
| 5,755,959 A | 5/1998 | Jönsson et al. | 210/189 |
| 5,895,567 A | 4/1999 | Van Der Herberg | 210/97 |
| 6,077,426 A | 6/2000 | Grabowski | 210/189 |
| 6,143,186 A | 11/2000 | Van Unen | 210/786 |

FOREIGN PATENT DOCUMENTS

| | | |
|---|---|---|
| DE | 4118283 | 12/1992 |
| EP | 0590705 | 4/1994 |

*Primary Examiner*—Robert J. Popovics
(74) *Attorney, Agent, or Firm*—Webb Ziesenheim Logsdon Orkin & Hanson, P.C.

(57) ABSTRACT

An improved vertical filtration unit which includes an airlift and a washbox designed for more efficient washing of dirt particles from the filtration material. The washbox consists of a filter media shield, and a washbox skirt for washing of the filtration material. A throttling valve on the wash water discharge line regulates the overall cleaning rate of the unit. The filtered liquid is discharged via a riser pipe which feeds into a filtered liquid box before exiting the filtration unit.

24 Claims, 3 Drawing Sheets

DESCENDING BED FILTER

CROSS-REFERENCE TO RELATED APPLICATION

This application is a division of U.S. patent application Ser. No. 09/553,511 filed Apr. 20, 2000, now U.S. Pat. No. 6,319,413.

BACKGROUND OF THE INVENTION

1. Field of the Invention

This invention relates to methods and apparatus for filtering liquids containing suspended solids. Specifically, this invention relates to an improved vertical filtration unit.

2. Background Art

The removal of suspended solids from liquids, especially water, has been a longstanding requirement for many uses of such liquids. For example, water which is free of suspended solids is greatly preferred for uses such as drinking, industrial processing and swimming pools. Vertical filters, which utilize filter media such as sand, have been used to separate suspended solids from water.

Vertical filters operate by introducing the liquid containing suspended solids onto the top portion of a bed of filter media, usually sand. As the liquid passes through the filter media under the force of gravity, the suspended solids adhere to the filter media, allowing liquid free of suspended solids to accumulate and exit from the bottom of the vertical filtration unit.

The above-described method, although effective at removing suspended solids from liquids, has several shortcomings.

The filter media eventually becomes saturated with suspended solids and no longer effectively removes suspended solids from the incoming liquid.

When the condition of (A) occurs, the vertical filtration unit must cease operation so that the captured suspended solids can be removed from the filter media. This removal is accomplished through an operation referred to as "backwashing," in which clean liquid is introduced, under pressure, to the bottom of the filter media bed and passes through the filter media in the reverse direction from the filtration process. The reverse flow of the liquid removes the filtered solids from the filter media and exits through the top of the vertical filter. This operation is typically continued until the exiting backwash water is free of suspended solids, indicating that the filter media is clean.

Backwashing can be very time consuming and generates large volumes of wastewater.

Filtered solids are never completely removed from the filter medial during backwashing which eventually results in the filter media needing to be replaced.

Filtration devices utilizing the above method are disclosed in U.S. Pat. No. 650,611.

The problem of backwashing filter media has been addressed, to some extent, through the development of continuous, or moving bed filtration systems. While these continuous filtration systems operate to remove suspended solids as outlined above, they have the added benefit of continuously removing filtered suspended solids from the filter media. In these methods, the dirtied filter media at the bottom of the vertical filter unit and a small amount of filtered water are airlifted to a washbox. This lifting is carried out by an airlift tube equipped with a compressed air supply. The mixture of filtered water, filtration sand and suspended solids is directed against a baffle or plate to scrub the suspended solid particles from the sand.

The washed sand is returned to the top of the filter media bed. The suspended solid particles, washed from the filter media, are flushed from the filter by a combination of filter effluent liquid and filtered liquid that carry the suspended solids across a reject weir and out of the vertical filtration unit. The filtration cycle automatically repeats itself with the influx of a new supply of liquid to be filtered.

Examples of the above-described continuous filtration systems are disclosed and explained in U.S. Pat. Nos. 4,060,484, 4,891,142 and U.S. Pat. No. 5,582,722, all of which are herein incorporated by reference.

The above-described continuous systems for the filtration of liquids and the removal of suspended solid particles are typically not as effective or efficient as industry and the public need and desire. These systems typically require level sensors and valve actuators which are expensive and fail when electrical power supply is lost. Many valves are often required which can cause confusion for those operating the filtration unit. The airlifting operation often "plugs" with filter media, causing the filtration unit to be shut down for cleaning. There remains an unmet need to provide a reliable, maintenance-free, continuous, self-cleaning, vertical filtration unit for the removal of suspended solids from liquids.

SUMMARY OF THE INVENTION

In the liquid filtering apparatus of the present invention, liquid is filtered by its downward gravitational flow through a bed of filter media, usually, but not necessarily sand. The filter media removes suspended solid particles from the liquid.

The filtered liquid is collected in a central filtered liquid collection chamber. The filtered liquid exits the collection chamber to a filtered liquid riser pipe which terminates at an external filtered liquid box. The filtered liquid then exits the filtration unit.

The solids captured by the filter media are drawn downward with the moving filter media bed into the suction area of an airlift. The captured solids, filter media and a small portion of filtered liquid are lifted through the airlift being discharged into a washbox. Air is injected into the airlift through a primary air manifold to effect the action in the airlift.

In the washbox, the captured solids, filter media, and liquid mixture from the airlift hits a filter media shield hood and reflects downward into the interior of the washbox. In this area, a portion of unfiltered liquid flows up from the bottom side of the washbox through cleaning water inlet nozzles proportionally spaced around the bottom side of the washbox. This portion of influent liquid, or wash liquid, separates and suspends the captured solids from the filter media and is piped by gravity to a dirtied liquid reject box.

The flow of wash liquid to the dirtied liquid reject box is regulated, for example, by a throttling valve. Thus, the overall flow rate through the liquid filtering apparatus may be controlled.

The wash liquid is then discharged from the dirtied liquid reject box.

The clean filter media is reintroduced to the top of the filter media bed. An alternative embodiment of the present invention utilizes a two-stage washbox. In the two-stage washbox, the captured solids, filter media and liquid mixture from the airlift hits a filter media shield hood and reflects downward onto a porous separation cone. The captured solids and liquid pass through the separation cone and into a dirtied liquid reject collection tray. The captured solids and liquid are piped by gravity to a dirtied liquid reject box. The filter media falls from the separation cone into the interior of the washbox. In the washbox interior, the filter media is washed with unfiltered liquid, as described above.

In a preferred embodiment of the present invention, the level of filtered liquid in the filtered liquid box is controlled by an overflow weir. The level of wash liquid in the dirtied liquid reject box is controlled by an overflow weir.

Still other objects of the present invention will become apparent to those of ordinary skill in the art upon reading and understanding the following detailed description and drawings.

DETAILED DESCRIPTION OF THE PREFERRED EMBODIMENT

In the following description and accompanying drawings, like reference numbers, as used in the various figures, refer to like features or elements.

Figure 1:
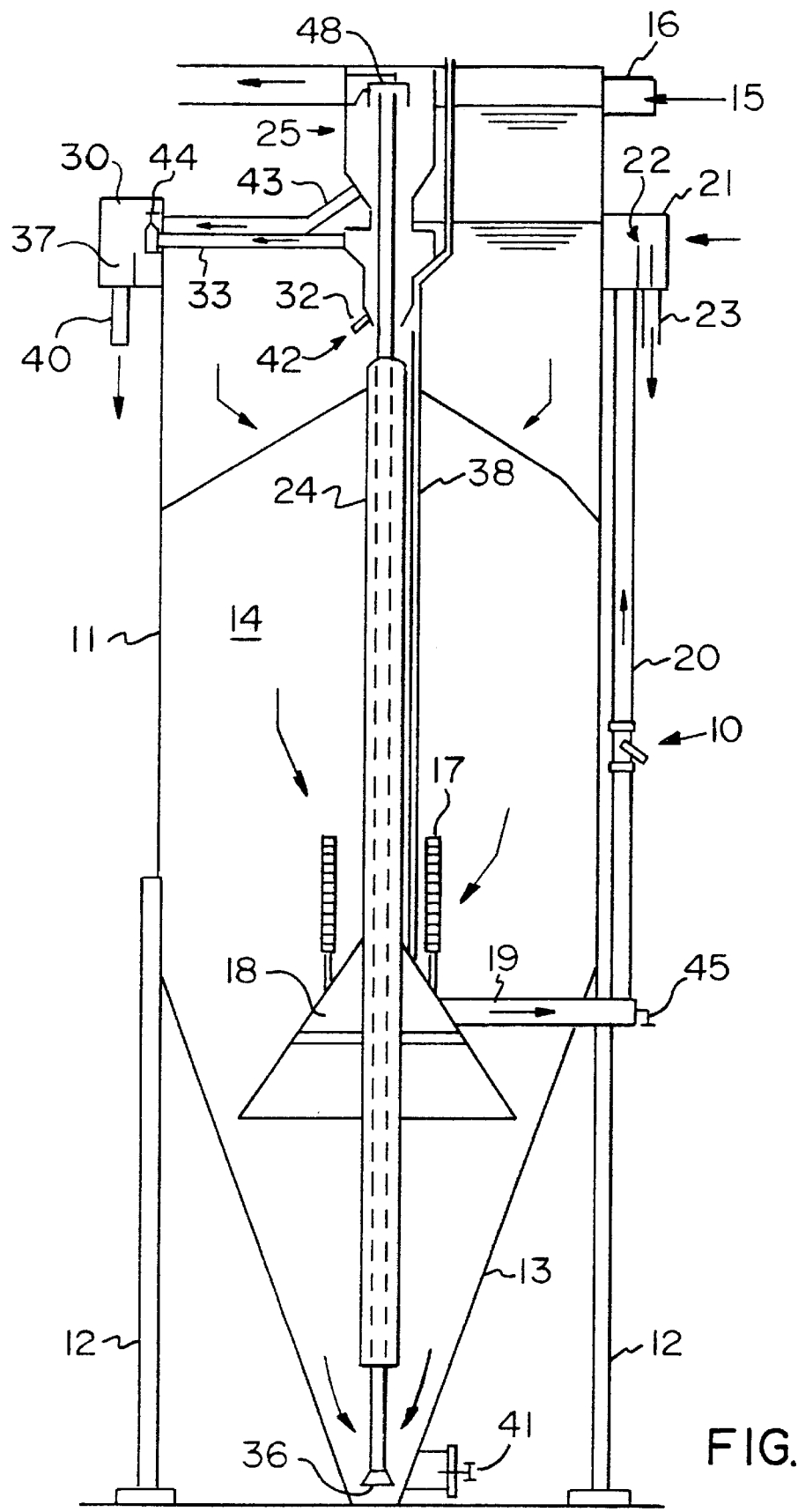
FIG. 1 is a schematic elevation view of the present invention showing internal components.

Referring to FIG. 1, filter unit 10 includes a vessel 11, which is defined by legs 12 and a sidewall 13. While the vessel 11 is depicted as cylindrical in cross section, it may be square or some other cross-sectional configuration. Vessel 11 contains a bed of particulate filter media 14, which may be sand, anthracite, ceramic beads, granular activated carbon, or another suitable filtration material. The filter media 14 is classified prior to being placed in vessel 11. If filter media particles that are too fine are included, liquid flow through the bed can be impeded. If filter media particles are too large, the internal parts can be damaged. It is preferred that the filter media particle size is less than 0.125 inches.

Filter media bed 14 may have a double tapered conical shape and filters an influent liquid 15 as it descends downwardly through the filter media bed 14. Enhanced filtration is accomplished if the particle size of the filter media bed 14 is coarser, or larger at the outer area, becoming finer, or smaller toward the middle and center of the filter media bed 14.

The upper conical configuration of the filter media bed 14 occurs naturally from the operation of the filtration unit. As the filter media drops from the washbox onto the top of the conical pile, the particles classify themselves. The larger filter media particles tend to roll down the slope of the cone. The smaller particles, however, tend to descend vertically through the interior of the cone portion. This action results in the preferred, natural conical configuration of the pile.

The filtration process begins with the entry of the influent liquid 15 into the vessel 11 through influent liquid intake 16. The influent liquid descends, due to gravity, through the conical filter media bed 14, toward the bottom of the filter. The influent liquid may be any liquid but will typically be water or wastewater.

The unfiltered influent liquid 15 tends to flow through the coarser outer layer rather than through the finer inner layer. Liquids typically follow the path of least resistance. The path of least resistance in this case is through the coarse particle size filter media because the space between particles is large compared to the finer filter media. Thus, the initial filtration of influent liquid 15 is accomplished by the coarse particle size filter media.

The partially filtered influent liquid is further filtered as it next flows through the interior layer of finer particle size filter media. The influent liquid then flows through multiple cylindrically shaped cartridge screens 17 to an effluent chamber 18 which collects the filtered liquid. The cartridge screens 17 surround effluent chamber 18. There must be a sufficient number of cartridge screens 17 to surround effluent chamber 18, typically, at least five cartridge screens are used. Preferred cartridge screens are pipe based screens with end caps, as sold by Tate Andale of Ontario, Canada. The filtered effluent liquid leaves the filtration unit through effluent line 19 to external effluent riser pipe 20. Filtered liquid value 45 can be used to take samples of the filtered liquid. The external effluent riser pipe 20 discharges into filtered liquid box 21. The filtered liquid leaves the filtered liquid box 21 through effluent line 23.

The height of filtered effluent liquid in filtered liquid box 21 may be controlled by a filtered liquid overflow weir 22. This approach allows for easy measurement and control of the filtered liquid flow rate. The filtered effluent liquid flows over filtered liquid overflow weir 22 and leaves the filtered liquid box 21 through effluent line 23.

The solids captured by the filter media bed 14 are drawn downward with the moving filter media bed 14 into an intake 36 area of an airlift 24. The continuous transport of dirty filter media from the bottom of the filter to a washbox 25 is carried out by the airlift 24. The performance of the filter unit depends, in great part, on the performance of the airlift. Airlifts themselves are well known in the fields of wastewater treatment and well hydraulics. A conventional airlift pump consists essentially of a vertical tube having its lower end submerged in a liquid or slurry to be pumped. The upper end of the tube discharges the pump material. In the case of the present invention, the upwardly transported mixture of dirty filter media and filtered liquid empties into the washbox 25. The height to which the mixture can be airlifted depends on the efficiency of the airlift system.

Figure 5:
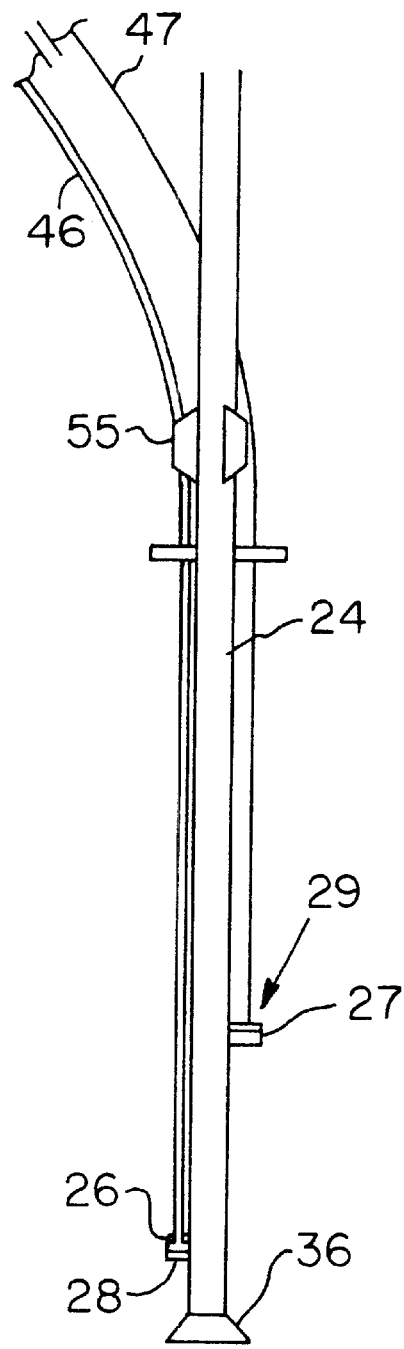
FIG. 5 is an isolation view of an airlift with a prime manifold.

The actual pumping or lifting action is achieved by the introduction of air into the lower part of the airlift 24 which also contains a mixture of filtered liquid and dirty filter media. The resultant mixture is lighter than the liquid in which the lower end is submerged. The upwardly directed pressure of the column of liquid in the base of the airlift 24 combined with lower specific gravity of the air, liquid, and filter media mixture inside the airlift 24 forces the mixture of dirty filter media and filtered liquid upward. As shown in FIG. 5, compressed air is introduced into the airlift 24 near its bottom through a primary air manifold 26. A prime air manifold 27 may be used to help start the airlift process. Primary air manifold 26 communicates with airlift 24 through passage 28. Prime air manifold 27 communicates with airlift 24 through passage 29. Compressed air is supplied to the interior of airlift 24 through the two manifolds 26, 27. The compressed air is supplied to primary air manifold 26 by compressed air line 46 and to prime air manifold 27 by compressed air line 47, both of which communicate with a source of compressed air (not shown) in order to maximize the air flow rate to the mixture being airlifted to washbox 25. The prime air manifold passage 29 is located above the primary air manifold 28. The airlift tube may have a bell-shaped bottom intake 36. This bell-shaped bottom intake increases the pumping rate. Thus, more filtered water, filter media and dirt can be pumped to the top of the filtration unit without increasing the air supply requirement.

Figure 3:
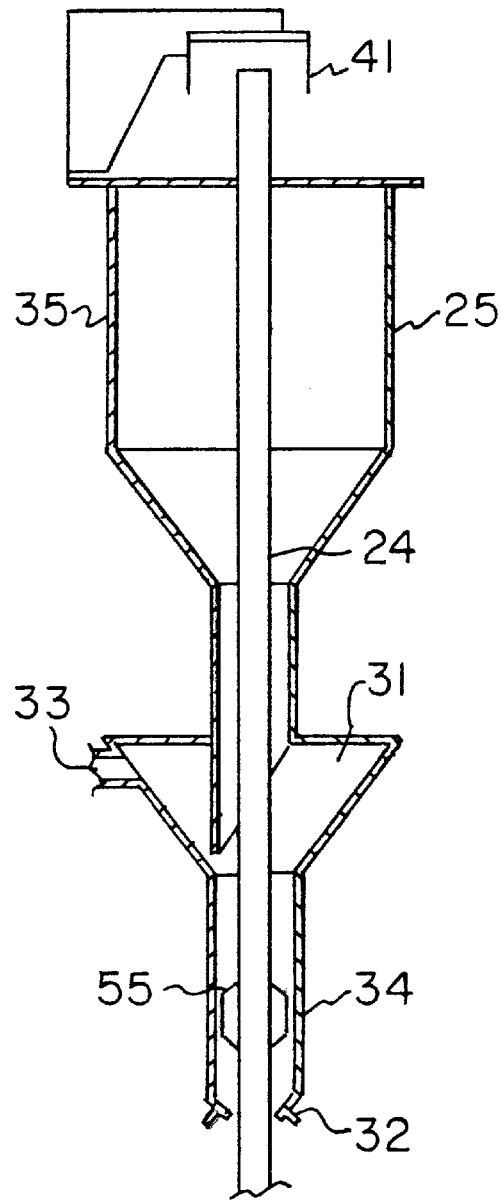
FIG. 3 is an isolation view of a one-stage cleaning washbox.
Figure 4:
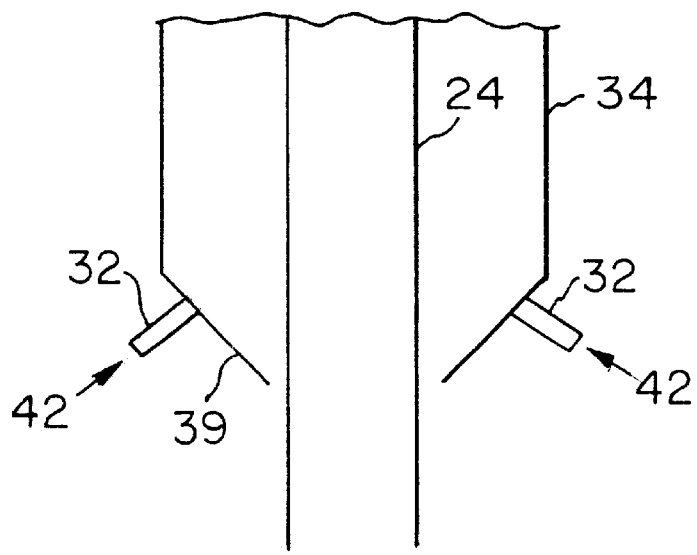
FIG. 4 is an isolation view of a washbox isolator.

FIG. 3 illustrates the construction of a one-stage washbox 25. Airlift 24 is centered within washbox 25 through the use of centering guides 55. The air, liquid, and filter media mixture rises through the airlift 24 and deflects from a filter media shield hood 48 into a washbox body 35. All cleaning is accomplished by influent liquid 42 that enters the washbox body 35 through cleaning liquid inlet nozzles 32 as shown in FIG. 4. There can be any number of cleaning liquid inlet nozzles 32. It is preferred that the cleaning liquid inlet nozzles 32 be proportionately spaced on the underside of washbox skirt 34. The preferred number of cleaning liquid inlet nozzles 32 is three. The cleaning liquid inlet nozzles 32 may alternatively be supplied, at least in part, with filtered liquid from the filtered liquid box.

The higher density filter media settles into the washbox skirt area 34. In this area, the influent liquid flows up from the bottom of the washbox skirt 34 via cleaning liquid inlet nozzles 32.

Influent liquid 42, or wash liquid, enters a washbox filter media liquid separation area 31 (defined by an unlabled enlarged section) via cleaning liquid inlet nozzles 32; there is a pressure difference between the liquid level in vessel 11, and a dirty liquid reject line 33. The action of this pressure differential urges the wash liquid out dirty liquid reject line 33 and provides automatic level control, eliminating the need for level sensors in the operation of the vertical filter of the present invention. The upward velocity of wash liquid keeps the lower density solids in suspension so they can be slurried and discharged to the dirtied liquid reject box 30. This slurry of solids and liquid is transported to the dirtied liquid reject box 30 via the dirtied liquid reject line 33.

Due to its higher density, the filter media settles in the washbox skirt 34. The wash liquid thus flows upward through an increasingly settled area of filter media before it reaches the dirtied liquid reject line 33. The filter media is thus cleaned at the washbox skirt area 34 before settling back to the top of the filter media bed 14 via washbox isolator 39. The washbox isolator 39 has a reducing, tapered portion at its lowermost point and reintroduces the filter media to the upper region of the filter media bed 14. This maintais the generally conical configuration of the bed.

The wash liquid discharges out of the dirtied liquid reject box 30 via dirtied liquid effluent line 40. A throttling valve 44 on the dirtied liquid reject line 33 may be used to adjust the flow rate of the wash liquid out of dirtied liquid reject box 30 by adjusting the flow in dirtied liquid reject line 33. Alternatively, a plate with an orifice sized appropriately to the system requirements can be used to regulate the flow in dirtied liquid reject line 33. Controlling the wash water flow rate is important in that too high of a flow rate can result in carryover of the filter media. Too slow of a flow rate can result in insufficient cleaning of the filter media.

The level of wash liquid in dirtied liquid reject box 30 may be controlled by a reject weir 37. The liquid level in the filtration unit vessel 11 will change accordingly with filtration head loss. Thus, reject weir 37 aids throttling valve 44 in the automatic level control feature of the vertical filter of the present invention. The flow rate of wash liquid will automatically change with the head loss or cleaning requirement within a desired reject rate range of four percent (4%) to seven percent (7%). The reject rate is the ratio of wash liquid effluent flow to influent liquid flow. This method eliminates the need for electronic level control systems, simplifies operation compared to previous vertical filters by having fewer valves, and allows the flow rate of wash liquid to be changed as the requirement for cleaning the filter media changes.

Figure 2:
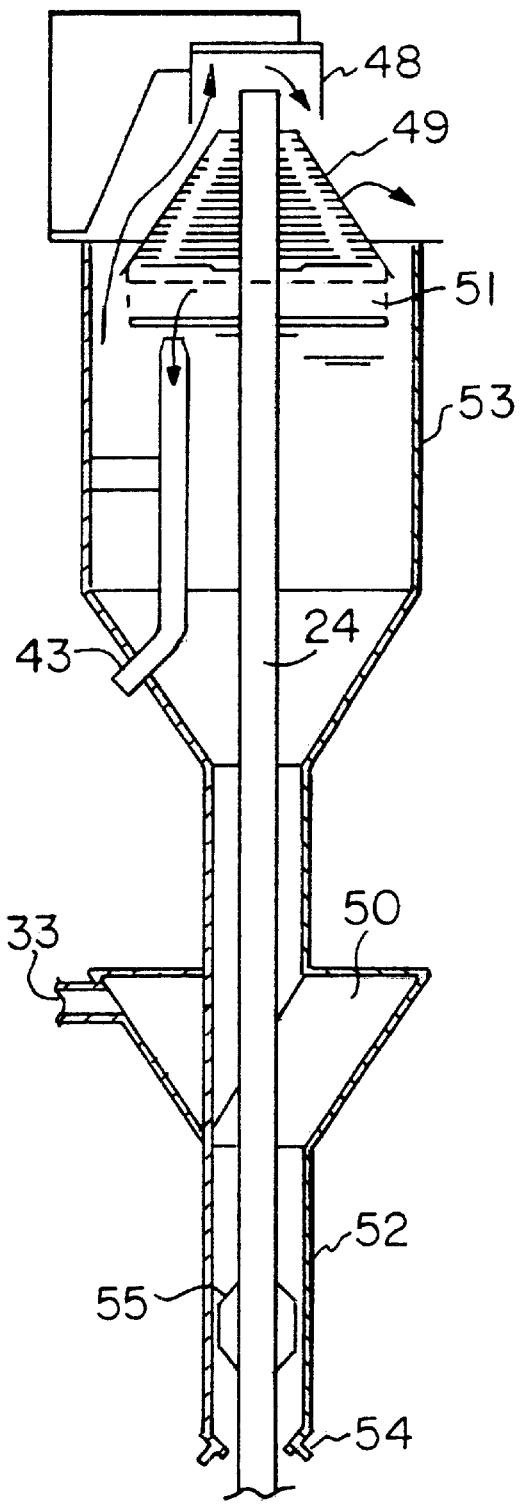
FIG. 2 is an isolation view of a two-stage cleaning washbox.

An alternative two-stage cleaning washbox apparatus is depicted in FIG. 2. In this scenario, the two-stage cleaning washbox 53 includes a filter media shield hood 48 which deflects the filtered liquid and dirty filter media downwardly onto a separation cone 49. This downward deflection efficiently washes dirt particles and solids from the filter media, along with the filtered liquid. The solids concentrated liquid from the airlift drops on the inclined porous surface of the separation cone 49 and passes through the surface of separation cone 49 into a dirtied liquid reject collecting tray 51. The separation cone 49 is constructed of a porous media or material. A woven, wedge wire construction is preferred for separation cone 49. The preferred wedge wire construction is such that the flat side of the wedge wire faces outward. The gap between the horizontally oriented wedge wire strands is up to 0.02 inches. The concentrated dirty liquid reject stream is piped by gravity through line 43 to the dirtied liquid reject box 30. This is the first wash stage.

The dewatered, partially cleaned, filter media moves down along the surface of the separation cone 49 and falls into a washbox filter media liquid separation area 50 and eventually into the washbox skirt 52 and is washed clean of filtered particles as described in the above-mentioned one-stage washbox 25 by unfiltered liquid, now wash liquid, entering into washbox skirt 52 via inlet nozzles 54. The wash liquid is then carried away by the dirtied liquid reject line 33. This is the second wash stage. The wash liquid from line 33 is then carried to the dirtied liquid reject box 30 where it is then removed from the filter unit as described above. Likewise, the dirtied liquid reject rate may be controlled by a throttling valve 44 on dirtied liquid reject line 33 as described in connection with the one-stage washbox 25.

The present invention is also directed to a method of filtering liquids. The preferred method will generally include the steps of:

providing a bed of filtration material, usually sand, comprising particles of different sizes, including large particles and fine particles, the bed having a general conical configuration;

introducing unfiltered liquid, typically water or wastewater, above the bed, which liquid is filtered through the bed in a downward direction, the unfiltered liquid passing through multi-cartridge screens into an effluent chamber to form a collection of filtered liquid;

removing the filtered liquid from the effluent chamber, transporting the filtered liquid through a riser pipe to a filtered liquid box wherein the flow and height of the filtered liquid is controlled by a weir, the filtered liquid flowing over the weir and exiting the filtered liquid box;

withdrawing dirty filtration material from the lower region of the bed;

transporting the dirty filtration material with a portion of the filtered liquid from a position in the lower region of the bed to a position above the bed;

separating dirt from the filtration material by deflecting the dirty filtration material and filtered liquid off of a filter media shield hood;

washing the filtration material by introducing a portion of unfiltered liquid at the bottom side of a washbox skirt in a counter-current manner, transporting the unfiltered liquid, now wash liquid, through the filtration material in the washbox skirt;

transporting the wash liquid to a dirtied liquid reject box;

regulating the flow of the wash liquid to the dirtied liquid reject box by use of a throttling valve;

discharging the wash liquid from the dirtied liquid reject box; and depositing clean filtration material to the top of the bed so as to maintain the generally conical configuration.

An alternative preferred method, using two-stage washing, will generally include the steps of:

providing a bed of filtration material, typically sand, comprising particles of different sizes, including large particles and fine particles, the bed having a general conical configuration;

introducing unfiltered liquid, typically water or wastewater, above the bed, which liquid is filtered through the bed in a downward direction, the filtered liquid passing through multi-cartridge screens into an effluent chamber to form a collection of filtered liquid;

removing the filtered liquid from the effluent chamber, transporting the filtered liquid through a riser pipe to a filtered liquid box wherein the height of the filtered liquid is controlled by a weir, the filtered liquid flowing over the weir and exiting the filtered liquid box;

withdrawing dirty filtration material from the lower region of the bed;

transporting the dirty filtration material with a portion of the filtered liquid from a position in the lower region of the bed to a position above the bed;

separating dirt from the filtration material by deflecting the dirty filtration material and filtered liquid off of a filter media shield hood, collecting filtration material on a porous surface, such as a wedge wire or metal wire mesh screen cone, transporting dirt laden filtered liquid through the porous surface, collecting the dirt laden screened liquid in a reject liquid collection tray;

conveying filtration material from the porous surface to a washbox skirt;

washing the filtration material in the washbox skirt by introducing a portion of unfiltered liquid at the bottom side of the washbox skirt, transporting the unfiltered liquid, now wash liquid, through the filtration material in the washbox skirt;

transporting the wash liquid and the dirt laden filtered liquid to a dirtied liquid reject box;

regulating the flow of the wash liquid to the dirtied liquid reject box by use of a throttling valve;

discharging the wash liquid and the dirt laden filtered liquid from the dirtied reject liquid box; and depositing clean filtration material to the top of the bed so as to maintain the generally conical configuration.

Alternatively, the wash liquid in the washbox skirt may be filtered water supplied from the filtered liquid box.

The invention has been described with reference to the preferred embodiments. Obvious modifications and alterations will occur to others upon reading and understanding the preceding detailed description. It is intended that the invention be construed as including all such modifications and alterations insofar as they come within the scope of appended claims or the equivalents thereof.

We claim:

1. A liquid filtering apparatus comprising:

a vessel;

a bed of filtration material within said vessel;

an intake for introducing into an upper region of said vessel an influent liquid to be filtered, said liquid being filtered by gravitationally descending through the bed to a lower region of said vessel;

an enclosure in said bed for collecting said filtered liquid;

an outlet for transporting said filtered liquid from said enclosure;

an airlifting tube for conveying a mixture of said filtration material dirtied by particulates taken from said liquid to be filtered and a portion of said filtered liquid from the lower region of said vessel to the upper region of said vessel, said airlifting tube terminating at a washbox;

said washbox comprising a washbox body and a filter media shield hood for deflecting said dirtied filtration material;

a washbox skirt below said filter media shield hood wherein said filtration material is washed in an enlarged section defining a washbox filter media separation area with a portion of said influent liquid entering into said washbox skirt through at least one cleaning water inlet nozzle wherein said enlarged section is beneath said washbox body and above said at least one cleaning water inlet nozzle;

a washbox isolator at the bottom of said washbox skirt through which the washed filtration material is reintroduced to an upper region of said bed;

a dirtied liquid reject line for conveying from the washbox, the influent liquid which has washed the filtration material; and means for introducing a primary gas to said airlifting tube to induce flow of said dirtied filtration material to said washbox.

2. The liquid filtering apparatus according to claim 1, wherein the filtration material is selected from the group consisting of sand, anthracite, ceramic beads and granular activated carbon.

3. The liquid filtering apparatus of claim 1, wherein the liquid is water or wastewater.

4. The liquid filtering apparatus of claim 1, wherein the intake at the lower end of said airlifting tube is a hollow bell-bottom shape.

5. The liquid filtering apparatus of claim 1, wherein an airlift primer line is communicated to said airlifting tube at a location above said means for introducing primary gas, said airlift primer line being connected to a compressed gas source.

6. The liquid filtering apparatus of claim 1 including a valve on said dirtied liquid reject line for adjusting the flow rate of liquid therethrough.

7. The liquid filtering apparatus of claim 1 including a filtered liquid box connected to said outlet, said filtered liquid box having a weir positioned in said filtered liquid box to control the level of filtered liquid therein.

8. The liquid filtering apparatus of claim 1 including a dirtied liquid reject box connected to said dirtied liquid reject line, said dirtied liquid reject box having a weir to control the level of liquid in said dirtied liquid reject box.

9. The liquid filtering apparatus of claim 1 including a plurality of multi-cartridge screens said filtered liquid passing through said multi-cartridge screens before entering said enclosure.

10. A liquid filtering apparatus comprising:

a vessel;

a bed of filtration material within said vessel;

an intake for introducing into an upper region of said vessel a liquid to be filtered, said liquid being filtered by gravitationally descending through the bed to a lower region of said vessel;

an enclosure in said bed for collecting said filtered liquid; said filtered liquid entering said enclosure through multi-cartridge screens in the lower region of said vessel;

an outlet for transporting said filtered liquid from said enclosure to an effluent riser pipe, said effluent riser pipe terminating at a filtered liquid box, the level of said filtered liquid in said filtered liquid box being controlled by a weir, said filtered liquid passing over said weir and exiting said filtered liquid box;

an airlifting tube for conveying a mixture of said filtration material dirtied by particulates taken from said liquid to be filtered and a portion of said filtered liquid from the lower region of said vessel to the upper region of said vessel, said airlifting tube terminating at a washbox;

said washbox comprising a filter media shield hood for deflecting said dirtied filtration material, a washbox body, a washbox skirt below said washbox body, and an enlarged section defining a washbox filtration media separation area beneath said washbox body and above said washbox skirt;

a washbox isolator, at the bottom of said washbox skirt, whereby the washed filtration material is reintroduced to the upper region of said bed and wherein, said filtration material is washed with a small portion of said influent liquid, now wash liquid, entering into said washbox skirt through cleaning water inlet nozzles located at the bottom of said washbox skirt;

a dirtied liquid reject line conveying the wash liquid from said washbox to a dirtied liquid reject box;

a valve near the terminus of said dirtied liquid reject line for adjusting said wash liquid flow rate;

said dirtied liquid reject box comprising a weir to control the height of said wash liquid in said dirtied liquid reject box and an outlet for said wash liquid to exit said dirtied liquid reject box; and means for introducing a primary gas to said airlifting tube to induce flow of said dirtied filtration material to said washbox.

11. The liquid filtering apparatus according to claim 10, wherein the filtration material includes sand.

12. The liquid filtering apparatus of claim 10, wherein the liquid is water or wastewater.

13. The liquid filtering apparatus of claim 10, wherein the intake at the lower end of said airlifting tube is a hollow bell-bottom shape.

14. The liquid filtering apparatus of claim 10, wherein an airlift primer line is communicated to said air lifting tube at a location above said means for introducing a primary gas, said airlift primer line being connected to a compressed gas source.

15. A liquid filtering apparatus comprising:

a vessel;

a bed of filtration material within said vessel;

an intake for introducing into an upper region of said vessel a liquid to be filtered, said liquid being filtered by gravitationally descending through the bed to a lower region of said vessel;

an enclosure in said bed for collecting said filtered liquid;

an outlet for transporting said filtered liquid from said enclosure to an effluent riser pipe, said effluent riser pipe terminating at a filtered liquid box;

an airlifting tube for conveying a mixture of said filtration material dirtied by particulates taken from said liquid to be filtered and a portion of said filtered liquid from the lower region of said vessel to the upper region of said vessel, said airlifting tube terminating at a washbox;

said washbox comprising a filter media shield hood for deflecting said dirtied filtration material, a porous separation cone below said filter media shield hood for separating said filtration material from said particulates and said filtered liquid, a dirtied liquid reject collection tray below said separation cone for collecting particulates and liquid which have passed through said separation cone;

a washbox skirt below said dirtied liquid reject collection tray;

a washbox isolator at the bottom of said washbox skirt whereby the washed filtration material is reintroduced to the upper region of said bed and wherein said filtration material is washed with a portion of said filtered liquid entering into said washbox skirt through cleaning water inlet nozzles located at the bottom of said washbox skirt;

a first dirtied liquid reject line communicating said dirtied liquid reject collection tray with a dirtied liquid reject box;

a second dirtied liquid reject line conveying said wash liquid from said washbox to the dirtied liquid reject box; and means for introducing a primary gas to said airlifting tube to induce flow of said dirtied filtration material to said washbox.

16. The liquid filtering apparatus according to claim 15, wherein the filtration material is selected from the group consisting of sand, anthracite, ceramic beads and granular activated carbon.

17. The liquid filtering apparatus of claim 15, wherein the liquid is water or wastewater.

18. The liquid filtering apparatus of claim 15, wherein the intake at the lower end of said airlifting tube is a hollow bell-bottom shape.

19. The liquid filtering apparatus according to claim 18, wherein said separation cone is constructed of wedge wire.

20. The liquid filtering apparatus of claim 15, wherein an airlift primer line is communicated to said airlifting tube at a location above said means for introducing primary gas, said airlift primer line being connected to a compressed gas source.

21. The liquid filtering apparatus of claim 15 including a valve on said dirtied liquid reject line for adjusting the flow rate of said wash liquid.

22. The liquid filtering apparatus of claim 15, wherein a weir is positioned in said filtered liquid box to control the level of said filtered liquid therein.

23. The liquid filtering apparatus of claim 15, wherein a weir is positioned in dirtied liquid reject box to control the level of said wash liquid in said dirtied liquid reject box.

24. The liquid filtering apparatus of claim 15, wherein said filtered liquid first passes through multi-cartridge screens before entering said enclosure.

* * * * *

UNITED STATES PATENT AND TRADEMARK OFFICE
CERTIFICATE OF CORRECTION

PATENT NO. : 6,517,712 B2
DATED : February 11, 2003
INVENTOR(S) : Yongming Xia et al.

It is certified that error appears in the above-identified patent and that said Letters Patent is hereby corrected as shown below:

Column 8,
Line 24, "nozzle wherein" should read -- nozzle, wherein --.
Line 26, "nozzle:" should read -- nozzle; --.

Column 9,
Line 25, "washbox filtration media" should read -- washbox filter media --.

Signed and Sealed this

First Day of July, 2003

JAMES E. ROGAN
*Director of the United States Patent and Trademark Office*